United States Patent [19]

Kim et al.

[11] Patent Number: 4,612,182

[45] Date of Patent: * Sep. 16, 1986

[54] METHOD OF PRODUCING CRYSTALLINE AMMONIUM METATUNGSTATE

[75] Inventors: Tai K. Kim; Martin B. MacInnis, both of Towanda; Robert P. McClintic, Monroeton, all of Pa.

[73] Assignee: GTE Products Corporation, Stamford, Conn.

[*] Notice: The portion of the term of this patent subsequent to Jul. 1, 2003 has been disclaimed.

[21] Appl. No.: 704,843

[22] Filed: Feb. 25, 1985

[51] Int. Cl.$^4$ .............................................. C01G 41/00
[52] U.S. Cl. ................................................... 423/593
[58] Field of Search .......................................... 423/593

[56] References Cited

U.S. PATENT DOCUMENTS 3,175,881  3/1965  Chiola et al. ...................... 502/200
3,956,474  5/1976  Ritsko .................................. 423/593
4,504,461  3/1985  Carpenter et al. ................... 423/593

Primary Examiner—John Doll
Assistant Examiner—Wayne A. Langel
Attorney, Agent, or Firm—Donald R. Castle; L. Rita Quatrini

[57] ABSTRACT

A method is disclosed for producing crystalline ammonium metatungstate from ammonium paratungstate. The method involves heating the ammonium paratungstate at from about 100° C. to about 250° C. for from about 1 hour to about 8 hours to remove some ammonia and water, digesting a solution of the heated ammonium paratungstate in water at from about 80° C. to about 100° C. for from about 2 hours to about 6 hours at relatively constant volume while maintaining the pH of the slurry at from about 4.2 to about 3.0 by addition of ammonia as necessary to form a solution of ammonium metatungstate in water. The ammonium metatungstate solution is then evaporated to concentrate it. Any insoluble material is separated from the solution. Ammonium metatungstate is then crystallized from the resulting concentrated ammonium metatungstate solution.

4 Claims, No Drawings

METHOD OF PRODUCING CRYSTALLINE AMMONIUM METATUNGSTATE

FIELD OF THE INVENTION

This invention relates to an improved method for producing ammonium metatungstate. More particularly, it relates to a method for producing ammonium metatungstate in crystalline form using ammonium paratungstate as the starting material.

BACKGROUND OF THE INVENTION

Tungsten, generally in the form of tungsten oxide, $WO_3$, is useful as a component of a variety of catalysts for chemical reactions. In most cases, in the manufacture of these catalysts it is necessary at some stage to provide a water soluble tungsten compound from which the tungsten oxide is derived. For example, certain types of catalysts comprise porous carriers such as, for example, alumina impregnated with compounds of catalytic elements such as tungsten. In the preparation of such catalysts the carrier materials are immersed, or slurried, in solutions of the compounds of the catalytic elements and then dried, leaving the catalyst compound intimately associated with the carrier. Ammonium metatungstate, $(NH_4)_6H_2W_{12}O_{40}.xH_2O$ is a particularly useful solute in such solutions. It offers the advantage of being readily soluble in water and, in addition, it decomposes readily on heating to leave the desired catalytic residue of tungsten oxide in the carrier. Alkali metal salts of the tungstates are also water soluble, but their use in catalyst manufacture is restricted by the fact that the presence of residual alkali metals frequently is objectionable in catalytic materials.

It has been proposed to obtain ammonium metatungstate solutions by baking crystalline ammonium paratungstate at temperatures of the order of 500° F. to drive off ammonia and to then dissolve the product of the baking operation in water. As is well known, a certain amount of ammonium metatungstate is produced by such a baking operation. However, thermogravimetric studies of this process have demonstrated that the ammomium paratungstate is not converted entirely to ammonium metatungstate at any particular temperature, nor after any particular baking time. To the contrary, other degradation products, particularly insoluble tungsten oxide also are continuously formed during the baking. In addition, certain amounts of unconverted ammonium paratungstate remain. As a result, substantial amounts of insoluble tungsten oxide and also ammonium paratungstate, which is only slightly soluble, remain undissolved when it is attempted to dissolve the product of the baking operation making it necessary to filter the solution before use, and discard or reprocess the insoluble materials. Also, as indicated above, the small amount of paratungstate remaining in solution my complicate the use of the solution because of its tendency to precipitate out with temperature changes or evaporation of the water.

U.S. Pat. No. 3,591,331 discloses a process for producing ammonium metatungstate without an appreciable formation of ammonium paratungstate. The process comprises contacting an aqueous ammonmium tungstate solution having a pH of at least about 9 with an organic extractant solution comprising di-2-ethylhexyl phosphoric acid, and a water insoluble hydrocarbon solvent, the components being in specified ratios to extract ammonium ions from the aqueous solution, separating the resultant aqueous solution from the organic solution, heating the aqueous solution to a temperature of at least about 60° C. for at least about 1 hour and recovering an essentially pure ammonium metatungstate.

U.S. Pat. No. 3,857,928 discloses a process for producing crystalline ammonium metatungstate from ammonium tungstate solution by introducing the ammonium tungstate solution into an ion exchange column containing a weak acid (carboxylic group) cation exchange resin, and collecting the effluent from the column until a pH of about 3.5 is reached. The effluent solution is then digested at about 98° C. for about 5 hours, followed by crystallization of ammonium metatungstate by conventional processes, such as, evaporation or spray drying.

U.S. Pat. No. 3,857,929 discloses a process for producing crystalline ammonium metatungstate from ammonium tungstate solution by introducing a strong acid cation exchange resin containing sulphonic group batchwise into an ammonium tungstate solution until a pH of about 3.5 is reached. The resin is then removed by filtration and the filtered solution is digested at about 98° C. for at least about 5 hours, followed by crystallization of ammonium metatungstate by conventional processes, such as, evaporation or spray drying.

U.S. Pat. No. 3,956,474 discloses a process for producing ammonium metatungstate from ammonium tungstate which involves the addition of about 3.6 percent by weight of silica to an ammonium tungstate solution, digestion for at least about 4 hours at a temperature of at least about 98° C. followed by filtration to remove silica from the ammonium metatungstate solution. Typically about 0.4 percent by weight of silica remains after filtering. The resulting ammonium metatungstate solution may be further processed to recover solid ammonium metatungstate, such as by evaporation or spray drying.

U.S. Pat. No. 3,936,362 discloses a process for producing ammonium metatungstate and other species by passing tungstate ions through an anion exchange membrane into an aqueous solution containing ammonium cations under the driving force of an electrical potential for a time sufficient to achieve a pH within the range in which the desired tungsten compound will form.

U.S. Pat. No. 3,175,881 discloses a method for producing crystalline ammonium metatungstate from ammonium paratungstate to the point at which a slurry containing about 9% by weight of material exhibits a pH of from about 3 to about 5, the heating time being generally from about 4 to about 8 hours, followed by evaporation of the slurry to about one-third of its original volume, filtering the concentrated slurry and then crystallizing ammonium metatungstate. Based on the $WO_3$ contents of the ammonium paratungstate starting material and the ammonium metatungstate produced, the yield is about 78.1%.

A more effective method of producing crystalline ammonium metatungstate from ammonium paratungstate in higher yields than the above would be desirable.

SUMMARY OF THE INVENTION

In accordance with one aspect of this invention, there is provided a method of producing crystalline ammonium metatungstate from ammonium paratungstate. The method involves heating the ammonium paratungstate at from about 100° C. to about 230° C. for from about 1 hour to about 8 hours to remove some ammonia and water, digesting a solution of the heated ammonium paratungstate in water at from about 80° C. to about 100° C. for from about 2 hours to about 6 hours at relatively constant volume while maintaining the pH of the slurry at from about 4.2 to about 3.0 by addition of ammonia as necessary to form a solution of ammonium metatungstate in water. The ammonium metatungstate solution is then evaporated to concentrate it; any insoluble material is separated from the solution. Ammonium metatungstate is then crystallized from the resulting concentrated ammonium metatungstate solution.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspectd of the invention.

By the process of this invention, crystalline ammonium metatungstate is produced from ammonium paratungstate in high yields.

Commercially available ammonium paratungstate which has the generally accepted formula $(NH_4)_{10}H_2W_{12}O_{41} \cdot xH_2O$ is heated or calcined to drive off ammonia and water vapor.

By the process described in U.S. Pat. No. 3,175,188, it was believed ammonium metatungstate which has the formula $(NH_4)_6H_2W_{12}O_{40} \cdot xH_2O$ could be produced by driving off the proper amount of ammonia and water, which would be generally from about 5% to about 7%, the variation being due to the varying amounts of waters of hydration in the ammonium paratungstate. Therefore the temperature and time of heating were designed to achieve weight losses in this range. However, the overall yield of ammonium metatungstate obtained by the process of this patent is only from about 75% to about 85%. It is now believed that the calcining conditions actually resulted in formation of insoluble material which was one of the major causes of the relatively low yield. The insolubles can be heteropoly phosphorus, or silicon, or ammonia deficient species as tungstic oxide which result from overcalcining and excessive loss of ammonia which is most likely in this case. By the process of this invention, the calcination of the ammonium paratungstate can be accomplished by heating the material in batches in trays, or the materials can be fed continuously through a rotary type kiln. In any case, there should be provision for ample exhaust of the ammonia and water vapor as it is evolved from the paratungstate to efficiently effect their removal.

Heating conditions depend to a certain extent on the type and manner of operation of the apparatus employed. It has been found that the calcination operation can be carried out in a continuous rotary calciner. Typically, using a rotary calciner, residence times of the order of about one hour normally are sufficient to drive off the proper amount of ammonia and water vapor from the ammonium paratungstate. Although, various combinations of temperatures, residence times and types of apparatus can be employed in the calcination, it has been found that the extent to which the calcination of the ammonium paratungstate is carried out is relatively critical. More particularly, if the material should be over calcined, an excessive quantity of free tungsten oxide is produces as was mentioned previously. At least a substantial portion if this may not be dissolved in the subsequent digestion step, and represents a loss of yield. On the other hand, insufficient calcination can result in a substantial residue of difficulty soluble ammonium paratungstate which can be lost along with the tungsten oxide in the subsequent digestion step or can remain as an undesirable contaminant of the crystalline ammonium metatungstate product.

By the process of this invention, the heating conditions are designed to give a weight loss of from about 1.1% to about 1.3%. In this range there are less ammonia deficient species formed and therefore less insolubles and the overall yield of ammonium metatungstate is substantially increased. Generally, the heating conditions found to be satisfactory are from about 1 hour to about 8 hours at about 100° C. to about 230° C., with from about 1 hour to about 3 hours at from about 180° C. to about 210° C. being preferred.

A slurry is then formed of the heated ammonium paratungstate in water, preferably deionized water, with generally from about 20 to about 40 parts of the ammonium paratungstate in from about 80 to about 60 parts of water. Although the method can be carried out with larger proportions of water, obvious inefficiencies are introduced because of the necessity for evaporating the excess water. Slightly smaller quantities of water can also be used but the subsequent digestion step may then not adequatgely convert any residual paratungstate to the metatungstate, the result being lower yields or contaminated product. Preferably the water is preheated to from about 60° C. to about 80° C. before the calcined material is added to it.

The resulting slurry is then digested at relatively constant volume below the boiling point of water, generally at from about 80° C. to about 100° C. for from about 2 hours to about 6 hours. It is critical that the materials be digested at the proper conditions of time and temperature to allow the conversion to the ammomium metatungstate structure. These digestion conditions are not taught in U.S. Pat. No. 3,175,188. For proper conversion to ammonium metatungstate, it is also critical that the pH range be maintained at from about 4.2 to about 3.0. During the digestion process there can also be some loss of ammonia, resulting in a drop in a pH. Therefore ammonia or ammonium hydroxide, aqueous ammonium can be added to maintain the pH in the proper range. As a result of the digestion, a solution of ammonium metatungstate in water is formed. There can also be some insoluble material present due to impurities, or some tungstic oxide, but this amount is very small.

The solution is then evaporate to a fraction, preferably about one-third of its original volume to concentrate the ammonium metatungstate. An open kettle is suitable for this purpose.

Any insoluble material is then separated from the concentrated ammonium metatungstate solution by any standard technique such as filtration.

Crystalline ammonium metatungstate can then be recovered from the concentrated solution by any conventional manner such as by evaporation or by spray drying.

Based on the $WO_3$ content of the starting ammonium paratungstate and the ammonium metatungstate produced, the yield is at least about 95%.

To more fully illustrate this invention, the following non-limiting example is presented. All parts, portions and percentages are on a weight basis unless otherwise states.

About 50 parts of ammonium paratungstate are heated at from about 190° C. to about 200° C. for about 1 to about 3 hours in an oven. After, heating, the weight loss is measured. The weight loss is from about 1.1% to about 1.3%. The heated ammonium paratungstate is slurried in about 300 parts of deionized water at about 80° C. for about 3 to about 6 hours. During digestion, the pH of the slurry is maintained at from about 3.6 to about 4.0 by adding ammonium hydroxide. The volume is allowed to decrease to about one third of its original volume. The concentrated slurry is then filtered and the product is then isolated by crystallizing ammonium metatungstate.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method of producing crystalline ammonium metatungstate from paratungstate, said method comprising:
   (a) heating said ammonium paratungstate at from about 100° C. to about 230° C. for from about 1 hour to about 8 hours to remove some ammonia and some water and form a heated ammonium paratungstate;
   (b) forming a slurry of said heated ammonium paratungstate and water;
   (c) digesting said slurry at from about 80° C. to about 100° C. for from about 2 hours to about 6 hours at relatively constant volume while maintaining the pH of said slurry at from about 4.2 to about 3.0 by the addition of ammonia as necessary to form a solution of ammonium metatungstate in water and some insoluble material;
   (d) evaporating said solution to a fraction of its original volume to form a relatively concentrated ammonium metatungstate solution;
   (e) separating any insoluble material from said concentrated ammonium metatungstate solution; and
   (f) crystallizing ammonium metatungstate from said concentrated ammonium metatungstate solution.

2. A method according to claim 1 wherein the ammonium paratungstate is heated at from about 180° C. to about 210° C. for from about 1 hour to about 3 hours.

3. A method according to claim 1 wherein the ammonium paratungstate is heated to give a weight loss of from about 1.1% to about 1.3%.

4. A method according to claim 1 wherein at least about 95% by weight of tungsten in said ammonium paratungstate is converted to ammonium metatungstate.

* * * * *